Figure 1:
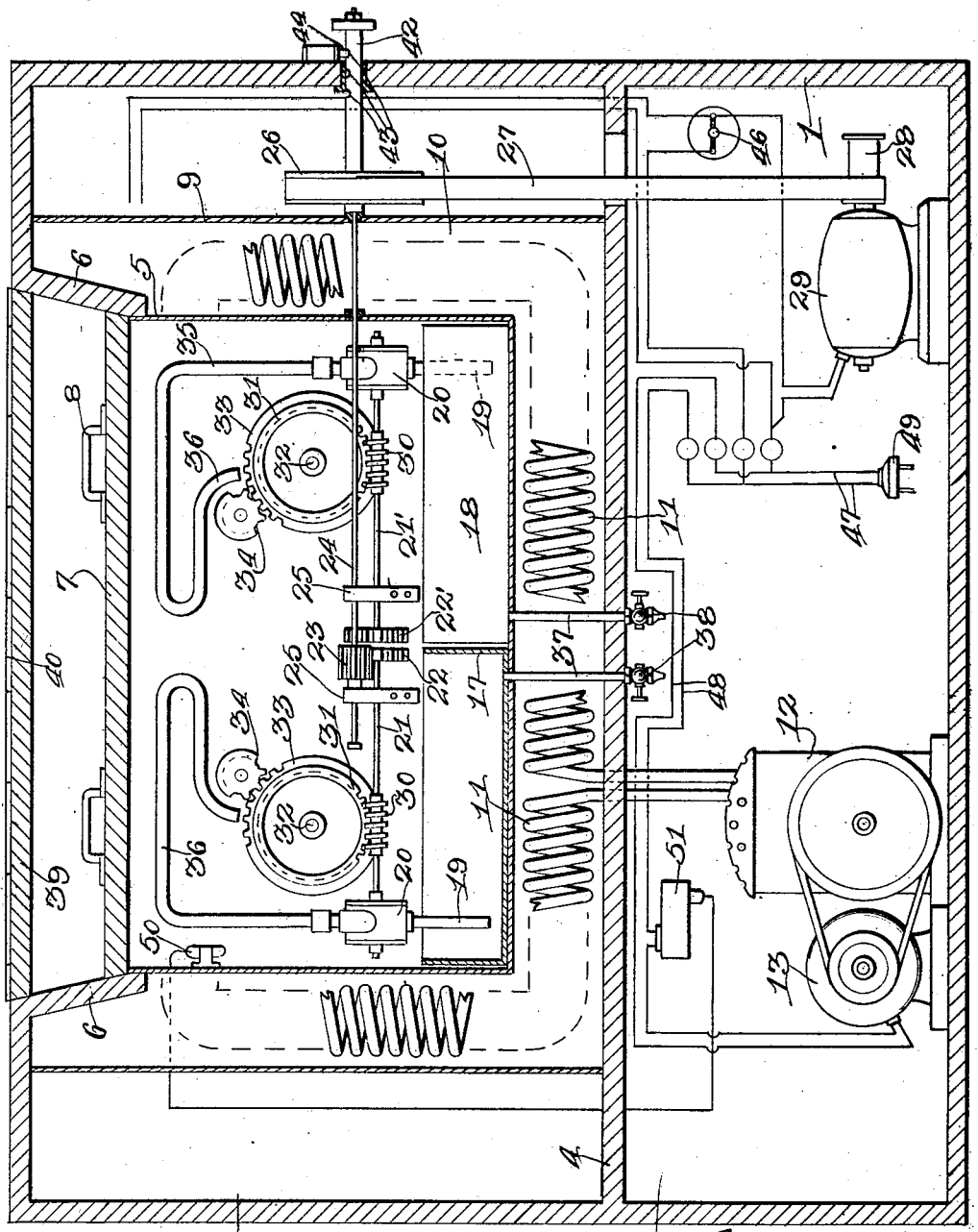

July 5, 1932.　　　J. HEISENFELDT ET AL　　　1,866,105
LUBRICANT TESTER
Filed Feb. 4, 1931　　　2 Sheets-Sheet 1

Inventors
J. Heisenfeldt
H. Walsh

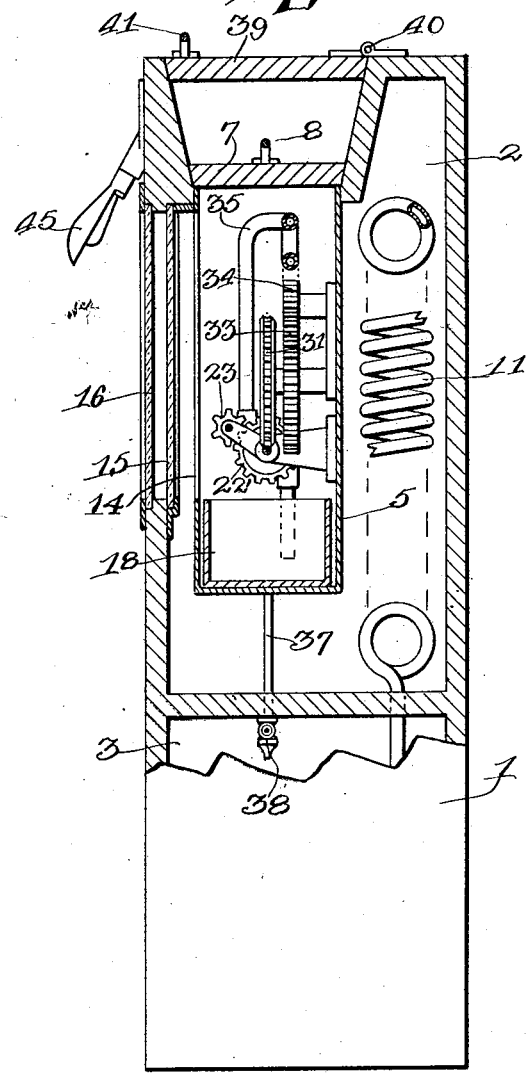

Patented July 5, 1932

1,866,105

UNITED STATES PATENT OFFICE

JOHN HEISENFELDT, OF WAUWATOSA, AND HARRY WALSH, OF MILWAUKEE, WISCONSIN

LUBRICANT TESTER

Application filed February 4, 1931. Serial No. 513,360.

This invention relates to improvements in a device for testing liquids and is especially adapted for testing lubricating oils.

It is a well known fact that a high grade of lubricating oil under low temperature will show no disintegration, due to the fact that there are no animal fats present and it consequently flows upon the gearing to be lubricated in a clear and uniform stream. On the other hand, an inferior grade of lubricating oil, when subjected to such temperatures, will show disintegration and visibly disclose lumpy particles as it is discharged upon the surface to be lubricated. As a matter of fact, this grade of oil under low temperature will disintegrate, and as it strikes the surfaces to be lubricated, it will rebound or roll off into particles and produce practically no lubricating effects whatsoever.

Obviously, in view of these well known conditions, a testing apparatus or equipment along the lines of our invention which preferably provides tanks or containers of different grades of oil, with means for distributing these oils over gearing, and with means for visibly inspecting oil under various temperatures as it flows from the containers, either simultaneously or selectively, is a great improvement over well known types of testing apparatus.

One of the objects of the present invention is the provision of a device for testing lubricating oils under predetermined temperatures, and resides in the production of means for creating a flow of the lubricants under predetermined temperatures, and directing them onto nests of gears so that the action of the oil can be determined, with the entire device arranged in an enclosed housing with a transparent front, so that the action of the oil will be clearly visible from the exterior, whereby it will be noted that the high grade of lubricating oil under either a high or low temperature will have the same action; while in the case of an inferior grade of oil, it will have a tendency to disintegrate when discharged upon the gear surfaces and reduce the lubricating effect of this particular grade of oil.

Another object of the present invention is the provision of a testing device of the above character, wherein the operative parts for the testing of the lubricant are arranged within a casing or housing having a cooling chamber surrounding the same in which suitable cooling coils can be disposed, and connected up with a refrigerating apparatus so that the casing in which the operative parts are located can be cooled to a predetermined degree for testing the lubricants, as well as to display the action of the different grades of the lubricant.

A further object of the present invention is the provision of a device of the above character which is preferably constructed so that the operation of the same will be clearly visible from the exterior of the device, so that the action of the different grades of lubricant can be viewed from the outside with the temperature upon the inside being regulated to various degrees, so as to determine the action of the different grades of lubricant under certain predetermined temperatures, to disclose the difference in the action of a high grade lubricant and a low grade.

With the above and other objects in view, the invention consists in the novel features of construction, the combination and arrangement of parts hereinafter more fully set forth, pointed out in the claims and shown in the accompanying drawings wherein:

Figure 1 is a sectional view through the main housing, illustrating a substantially diagrammatic view of the device; and, Figure 2 is a vertical sectional view taken through the device.

In the accompanying drawings, we have for the purpose of illustrating the construction and operation of our device, disclosed the same as arranged in a main housing 1, divided into an upper compartment 2 and a lower compartment 3 by means of a horizontal partition wall 4.

Within the upper compartment 2, the testing casing 5 is arranged and may be supported in this compartment in any suitable manner with its upper edge engaged with the depending flanges 6 which are disposed on an incline, as shown in Figure 1, and adapted to receive the removable cover 7 which is used for closing the top of the casing 5. Suitable handles 8 are attached to the cover 7 to facilitate the removal and displacement of this cover.

Surrounding the casing 5 within the chamber 2 is a rectangular housing 9, spaced from the casing 5 to form a cooling chamber 10 in which suitable coils 11 are arranged. These coils 11 are connected up with a small refrigerating plant 12 operated by means of a motor 13.

One side of the casing 5 is provided with an opening 14, and alined therewith the housing 1 supports an inner transparent panel 15 and an outer, transparent panel 16.

Within the casing 5 there are supported upon the bottom thereof, separate receptacles 17 and 18 for containing lubricants of different grades. Extending into each receptacle is a pipe 19 leading up to a pump 20. These two pumps 20 which have their pipe 19 extending into the two receptacles 17 and 18, are mounted on two separate shafts 21 and 21', having the gears 22 and 22' mounted upon the inner ends thereof and adapted to mesh with an elongated pinion 23 which is of sufficient width that it may engage either one of the gears, or simultaneously engage both gears.

The pinion 23 is mounted upon a shaft 24 supported by bearings 25 and carries a pulley 26 connected by means of a belt 27 with the pulley 28 on the drive shaft of motor 29.

The shafts 21 and 21' carry worms 30 adapted to mesh with worm gears 31 on stub shafts 32. The stub shafts 32 also support spur gears 33 connected with worm gears 31 and adapted to be engaged by the pinions 34.

Extending upwardly from the pumps 20 are the tubes 35 which are preferably of transparent material, although any desirable material may be used in the construction of these tubes. The tubes 35 have a curved discharge portion 36 at the upper ends which direct the fluid onto the gears 31 and 33, so that the action of the fluid on these gears may be readily ascertained.

Each receptacle 17 and 18 is provided with a drain pipe 37 which leads down through the partition 4 and the pipes are provided with suitable cocks 38, whereby the fluid from the receptacles 17 and 18 may be drawn off whenever desired. The opening surrounded by the depending flange 6 is normally closed by means of a cover 39, hinged to the body 1 as shown at 40. The cover 39 carries a handle 41 to facilitate the raising and lowering of this cover when it is desired to remove the cover 7 and gain access to the casing 5.

It will be noted that the shaft 24 is provided at its outer end with an enlarged portion 42, provided with spaced notches 43 adapted to be engaged by a spring-pressed plunger 44 for retaining the shaft 24 in various axially adjusted positions.

In order that the operating mechanism within the casing 5 may be plainly visible, a light 45 is supported by the housing 1 and arranged to direct its rays into the casing 5 through the transparent panels 15 and 16, so that the action of the different lubricants being tested may be readily ascertained. It will be noted that the light 45 is connected in circuit with the motor 29 and switch 46 is provided for controlling the motor and light 45.

It will be noted that the motor 13 is connected in circuit with the conductors 47 by means of conductors 48 and conductors 47 are connected to the well known type of plug 49 which may be engaged with a wall plug or the like. Arranged within the casing 5 is a thermostatic element 50 connected up with a switch 51 arranged within one of the conductors 48 whereby when the conductor within the casing 5 reaches a predetermined degree, the thermostatic element 50 will actuate the switch 51 and cut off the circuit to the motor 13. This thermostatic element 50 can be set to operate at various temperatural degrees, so that in testing different grades of lubricant, the thermostatic element can be set accordingly.

While we have described and illustrated means for providing a cooling medium for cooling the interior of the casing 5, it will be apparent that suitable means may be provided for heating the interior of this casing to also determine the action of different grades of lubricant under high temperatures and various arrangements of gears may be provided for discharging the lubricant thereon to display the action of the different grades of lubricant.

We claim:

1. A display and testing device for lubricants comprising a cabinet, a casing arranged in the cabinet and spaced from the walls thereof, the casing and cabinet having sight panels, means arranged in the cabinet for governing the temperature of the casing, driven intermeshing testing gears arranged in the casing, an oil pan in the casing disposed directly below the gears for receiving oil therefrom, and means delivering oil from the pan between the meshing gears.

2. A display and testing device for lubricants comprising a cabinet, a casing arranged within the cabinet and spaced from the walls thereof, means arranged within the cabinet for changing the interior temperature of the casing, pairs of intermeshing gears arranged within the casing on opposite sides thereof, independent oil-receiving pans arranged within the casing below the pairs of intermeshing gears, independent pumps communicating with the independent pans for delivering oil from the pans to the intermeshing gears, a pair of drive shafts, means for driving one pump and one set of intermeshing gears of the pairs of intermeshing gears from each drive shaft, a power shaft, and means for driving either one or both of the drive shafts from the power shaft.

3. A display and testing device for lubricants comprising a cabinet, a casing arranged in the cabinet and spaced from the walls thereof, the cabinet and casing having sight windows, means arranged within the cabinet for changing the temperature within the casing, intermeshing testing gears arranged within the casing, an oil-receiving pan located directly below the intermeshing gears, a pump for delivering oil from the pan between the intermeshing gears and a drive shaft for synchronously operating the pump and the intermeshing gears.

4. A display and testing device for lubricating oils comprising a cabinet, a casing arranged within the cabinet and spaced from the walls thereof, the casing and cabinet having sight windows therein, means arranged within the cabinet for changing the temperature within the casing, intermeshing gears arranged in the casing, a pan located directly below the intermeshing gears for receiving oil therefrom, one of said meshing gears having connected therewith a worm gear, a pump for delivering oil from the tank between the intermeshing gears, said pump including a pump shaft provided with a worm meshing with the worm gear and a spur gear, and a power shaft having a drive gear movable into and out of engagement with the spur gear.

In testimony that we claim the foregoing we have hereunto set our hands at Milwaukee, in the county of Milwaukee, and State of Wisconsin.

JOHN HEISENFELDT.
HARRY WALSH.